(12) United States Patent
Kotecha et al.

(10) Patent No.: US 8,611,217 B2
(45) Date of Patent: *Dec. 17, 2013

(54) SUBSCRIBER/SERVICE DIFFERENTIATION IN ADVANCED WIRELESS NETWORKS

(75) Inventors: Lalit R. Kotecha, San Ramon, CA (US); William H. Stone, Basking Ridge, NJ (US); Lee K. Tjio, Danville, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 324 days.

This patent is subject to a terminal disclaimer.

(21) Appl. No.: 13/035,280

(22) Filed: Feb. 25, 2011

(65) Prior Publication Data

US 2012/0218892 A1 Aug. 30, 2012

(51) Int. Cl.
*G01R 31/08* (2006.01)
*H04W 4/00* (2009.01)
*H04L 12/28* (2006.01)

(52) U.S. Cl.
USPC ........ 370/230.1; 370/232; 370/233; 370/234; 370/236; 370/328; 370/395.21; 370/395.43

(58) Field of Classification Search
None
See application file for complete search history.

(56) References Cited

U.S. PATENT DOCUMENTS

| | | | |
|---|---|---|---|
| 2007/0073904 A1* | 3/2007 | Leung et al. | 709/247 |
| 2010/0128722 A1* | 5/2010 | Madour et al. | 370/352 |
| 2010/0322069 A1* | 12/2010 | Song et al. | 370/229 |
| 2011/0075744 A1* | 3/2011 | Laselva et al. | 375/259 |
| 2012/0028626 A1* | 2/2012 | Marocchi et al. | 455/422.1 |
| 2012/0033590 A1* | 2/2012 | Jazra et al. | 370/310 |
| 2012/0140669 A1* | 6/2012 | Wang et al. | 370/252 |
| 2012/0182868 A1* | 7/2012 | Lovsen et al. | 370/230 |
| 2012/0236782 A1* | 9/2012 | Bucknell et al. | 370/315 |

* cited by examiner

*Primary Examiner* — Yemane Mesfin
*Assistant Examiner* — Christine Duong

(57) ABSTRACT

A base station for an Internet protocol (IP) wireless access network receives a policy for subscriber traffic over a particular bearer, where the policy includes a particular quality-of-service control indicator (QCI) value, and an average bit rate (ABR) value, a maximum bit rate (MBR) value, and a weight factor value associated with the QCI value. The base station detects network congestion associated with the IP wireless access network and applies, to the subscriber traffic over a particular bearer, the weight factor, the ABR value, and/or the MBR value to manage the network congestion.

20 Claims, 12 Drawing Sheets

SUBSCRIBER/SERVICE DIFFERENTIATION IN ADVANCED WIRELESS NETWORKS

BACKGROUND

A fourth generation (4G) wireless network is an Internet protocol (IP) wireless access network in which different advanced multimedia application services (e.g., voice over IP (VoIP) content, video content, etc.) are delivered over IP. As wireless network data rates improve using 4G technologies, more and more bandwidth-intensive applications and devices are being developed. For example, some mobile devices, such as smart mobile devices like iPhone and Android devices, may receive high bit rates of 10-50 megabits per second (Mbps) or more, which is significantly more data than a typical cellular phone. In a multiple access network, these different devices and multimedia application services compete for the same air interface and transport network resources.

To differentiate services, mobile service providers tend to provide different rate limiting (e.g., an average maximum bit rate) to different subscribers and at the same time provide monthly data usage buckets. This rate limiting may not be particularly effective during periods of network congestion, particularly congestion of an over-the-air interface when Quality of Service (QoS) measures may be employed. Furthermore, some applications, such as video streaming applications, require a variable bit rate, which relies on both an average bit rate (ABR) and maximum bit rate (MBR). Current QoS frameworks for IP wireless access networks do not support use of both ABR and MBR values. Thus, mobile service providers continue to seek improved techniques to differentiate subscribers based on priority of traffic.

DETAILED DESCRIPTION OF PREFERRED EMBODIMENTS

The following detailed description refers to the accompanying drawings. The same reference numbers in different drawings may identify the same or similar elements.

Systems and/or methods described herein may provide subscriber differentiation by introducing a configurable weight factor into a QoS framework for an IP wireless access network. The systems and/or methods may also include average bit rate (ABR) values, along with maximum bit rate (MBR) values, in the QoS framework for variable bit rate applications.

In one example implementation, the systems and/or methods may receive a policy for subscriber traffic over a particular bearer in an IP wireless access network. The policy may include a particular quality-of-service control indicator (QCI) value; and an ABR value, an MBR value, and a weight factor associated with the QCI value. The systems and/or methods may detect network congestion associated with the IP wireless access network and may apply, to the bearer traffic, the weight factor, the ABR value, and/or the MBR value to manage the network congestion. For example, during periods of congestion, the systems and/or methods may allocate bandwidth to different users based on QoS settings associated with each respective bearer. Furthermore, the systems and/or methods may apply the ABR value and the MBR value to provide traffic shaping and scheduling functions. The systems and/or methods may further control admission to the IP wireless access network based on resource utilization information and ABR values associated with particular bearer requests.

As used herein, the terms "subscriber" and/or "user" may be used interchangeably. Also, the terms "subscriber" and/or "user" are intended to be broadly interpreted to include a user device (e.g., a mobile telephone, a smart phone, etc.) or a user of a user device.

Figure 1:
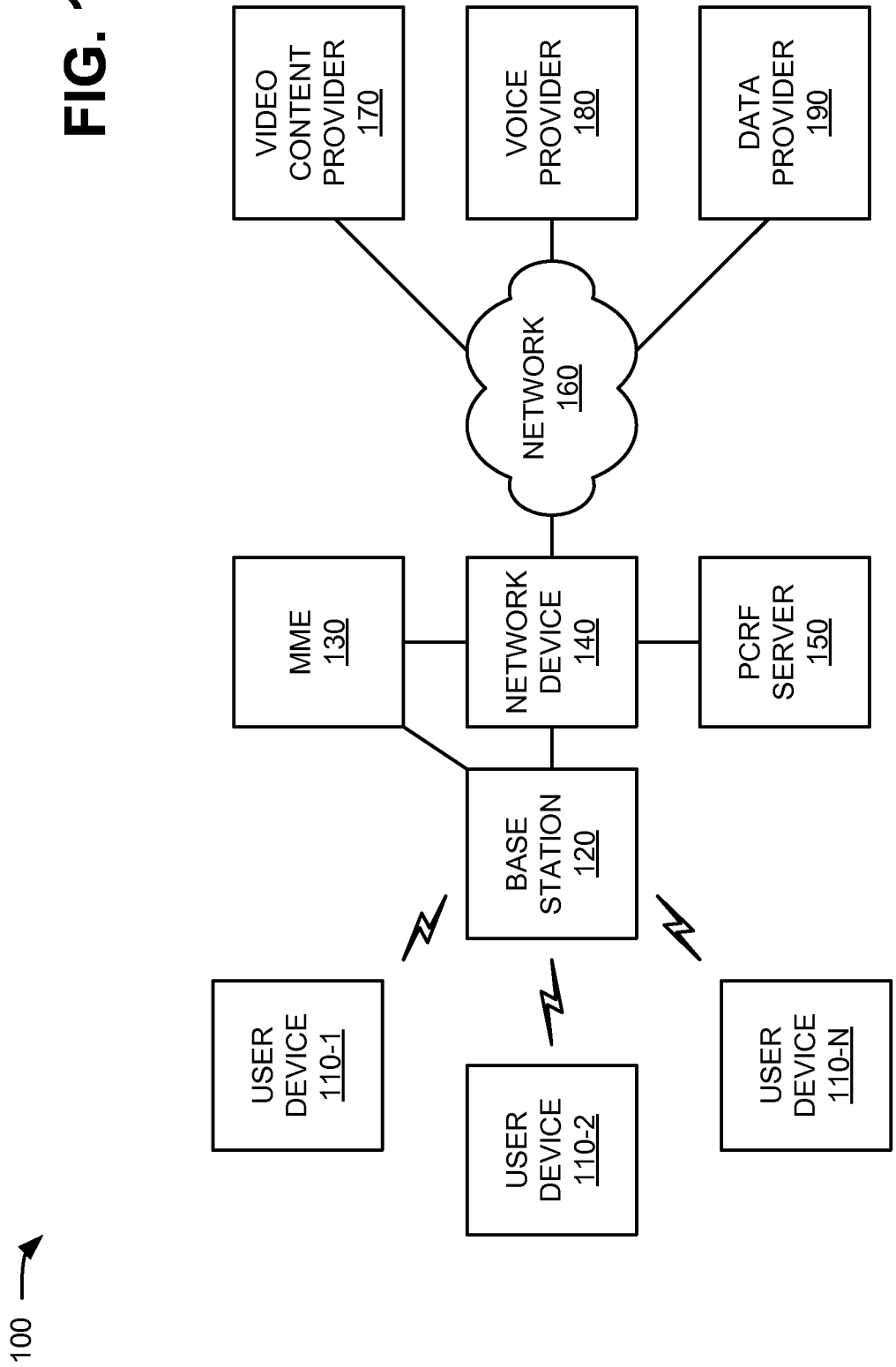
FIG. 1 is a diagram of an example network in which systems and/or methods described herein may be implemented.

FIG. 1 is a diagram of an example network 100 in which systems and/or methods described herein may be implemented. As illustrated, network 100 may include user devices 110-1, 110-2, . . . 110-N (collectively referred to herein as "user devices 110," and, in some instances, singularly as "user device 110"), a base station 120, a mobility management entity (MME) 130, a network device 140, a policy and charging rules function (PCRF) server 150, a network 160, a video content provider 170, a voice provider 180, and a data services provider 190. Components of network 100 may interconnect via wired and/or wireless connections. Three user devices 110, one base station 120, one MME 130, one network device 140, one PCRF 150, one network 160, one video content provider 170, one voice provider 180, and one data services provider 190 have been illustrated in FIG. 1 for simplicity. In practice, there may be more user devices 110, base stations 120, MMEs 130, network devices 140, PCRFs 150, networks 160, video content providers 170, voice providers 180, and data services providers 190.

User device 110 may include any device that is capable of communicating with network 160 via an IP wireless access network (e.g., provided by base station 120, MME 130, and/or network device 140). For example, user device 110 may include a mobile computation and/or communication device, such as a radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a wireless device, a smart phone, a laptop computer (e.g., with a wireless air card), a global positioning system (GPS) device, a content recording device (e.g., a camera, a video camera, etc.), etc. In another example, user device 110 may include a fixed (e.g., provided in a particular location, such as within a subscriber's home) computation and/or communication device, such as a laptop computer, a personal computer, a tablet computer, a set-top box (STB), a television, a gaming system, etc. Further details of user device 110 are provided below in connection with, for example, one or more of FIGS. 2, 3, 5, 6, and 9.

Base station 120 may include one or more computation and/or communication devices that receive voice and/or data from MME 130 and/or network device 140 and wirelessly transmit that voice and/or data to user device 110. Base station 120 may also include one or more devices that wirelessly receive voice and/or data from user device 110 and transmit that voice and/or data to one of MME 130 and/or network device 140 or to other user devices 110. Base station 120 may also monitor resource utilization information of the IP wireless access network. In an implementation herein, base station 120 may enforce QoS constraints due to congestion in the wireless IP access network. In some cases, base station 120 may take the form of an eNodeB.

In one example implementation, base station 120 may receive an initial attach request or bearer request from user device 110. Based on the initial attach request or bearer request, base station 120 may eventually receive a subscriber bearer policy that includes a particular QCI value for the bearer; an uplink QCI configuration that includes an ABR, an MBR, and a weight factor ($W_i$); and a downlink QCI configuration that includes an ABR, an MBR, and a weight factor ($W_i$). Based on the QCI value and the uplink weight factor, base station 120 may calculate an uplink bandwidth allocation and may provide the calculated uplink bandwidth allocation to user device 110 to rate limit uplink traffic (e.g., during periods of network congestion). Based on the QCI value and the downlink weight factor, base station 120 may also calculate a downlink bandwidth allocation and use the calculated downlink bandwidth allocation to rate limit downlink traffic (e.g., during periods of network congestion). Base station 120 may also control admission to the wireless access network based on resource utilization information and ABR values associated with particular bearers. Further details of base station 120 are provided below in connection with one or more of FIGS. 2-4 and 6-9.

MME 130 may include one or more computation and/or communication devices that provide a convergence point between wireless protocols (e.g., associated with user device 110 and/or base station 120) and IP protocols (e.g., associated with PCRF 150 and network 160). MME 130 may be involved in a bearer activation/deactivation process (e.g., for user device 110) and may choose a network device 140 for user device 110 during an initial attachment and/or handover.

Network device 140 may include one or more data transfer devices, such as a mobile gateway, a router, a switch, a firewall, a network interface card (NIC), a hub, a bridge, a proxy server, an optical add-drop multiplexer (OADM), or some other type of device that processes and/or transfers data. In one example, network device 140 may route packets (or portions of packets) from a wireless network (e.g., user device 110 and base station 120) to another network (e.g., network 160).

In one example implementation, network device 140 may receive (e.g., from PCRF 150) a policy configuration (e.g., that includes a QCI value for a particular bearer; an uplink QCI configuration that includes an ABR, MBR, and weight factor ($W_i$); and a downlink QCI configuration that includes an ABR, MBR, and weight factor ($W_i$)) for a subscriber and/or an application service associated with user device 110. Network device 140 may provide the policy configuration to base station 120 and/or MME 130. Further details of network device 140 are provided below in connection with, for example, one or more of FIGS. 2, 3, 5, and 6.

In one example, base station 120, MME 130, and/or network device 140 may provide an IP wireless access network for user device 110. The IP wireless access network, in one implementation, may correspond to a 4G network, a Long Term Evolution (LTE) network, an advanced LTE network, etc. The LTE network may include a communications network that connects subscribers (e.g., user devices 110) to a service provider (e.g., video content provider 170, voice provider 180, data provider 190, etc.). In another implementation, the IP wireless access network may include a WiFi network or another type of access network (e.g., an enhanced high-rate packet data (eHRPD) network or a WiMax network). In other implementations, the wireless access network may include a wireless network other than an IP wireless access network.

PCRF 150 may include one or more computation or communication devices that may provide policy control decision and flow based charging control functionalities. PCRF 150 may provide network control regarding service data flow detection, QoS and flow based charging, etc. PCRF 150 may determine how a certain service data flow shall be treated, and may ensure that user plane traffic mapping and treatment is in accordance with a user's subscription profile. In one example implementation, PCRF 150 may receive (e.g., from a network administrator) a policy configuration for subscribers and/or application services provided by the IP wireless access network (e.g., provided by base station 120 and/or network device 140).

The subscriber policy configuration may define rate limits and QoS policies associated with subscribers of the IP wireless access network. For example, the subscriber policy configuration may include a QoS level (e.g., a particular QCI value); an uplink QCI configuration that includes an ABR, MBR, and weight factor ($W_i$); and a downlink QCI configuration that includes an ABR, MBR, and weight factor ($W_i$). The ABR value may include an average bit rate, configured based on a type of application associated with a QCI class, and a particular averaging duration ($T_{avg}$). The MBR may include a maximum bit rate that may be temporarily used for the bearer. The weight factor may include a value ($W_i$) associated with each QCI value for a non-guaranteed bit rate (non-GBR) bearer (e.g., QCI values 5-9 in a Differentiated Services Code Point (DSCP) model, although other models may be used). The weight factor may determine the weighted priority of subscriber traffic associated with a specific QCI during periods of network congestion (e.g., when QoS measures are applied). The weight factor may be a configurable parameter and tunable based on the type of application. Thus, a specific type of application may be assigned different QCI values, but provide a similar user experience based on assigned weight values, $W_i$. Each uplink ABR, MBR, and/or $W_i$ value may include a corresponding different or same downlink ABR, MBR, and/or $W_i$ value.

Network 160 may include a local area network (LAN), a wide area network (WAN), a metropolitan area network (MAN), a telephone network, such as the Public Switched Telephone Network (PSTN), an intranet, the Internet, an optical fiber (or fiber optic)-based network, a cable television network, a satellite television network, or a combination of networks. In one implementation, network 160 may include an IP core network and/or one or more packet data networks (PDNs).

Video content provider 170 may include one or more server devices, or other types of computation or communication devices, that gather, process, search, and/or provide information in a manner described herein. In one implementation, video content provider 170 may include a computer system, an application, a cable head-end, and/or a broadcasting device capable of providing video content (e.g., video on demand (VOD) content, high definition (HD)-VOD content, TV programming, movies, on-demand services, live television, video telephony (VT), video streaming, etc.), commercials, advertisements, instructions, and/or other information to user devices 110.

Voice provider 180 may include one or more server devices, or other types of computation or communication devices, that gather, process, search, and/or provide information in a manner described herein. In one implementation, voice provider 180 may include a computer system, an application, and/or a computation device capable of providing voice content (e.g., VoIP) and/or other information to user devices 110.

Data provider 190 may include one or more server devices, or other types of computation or communication devices, that gather, process, search, and/or provide information in a manner described herein. In one implementation, data provider 190 may include a computer system, an application, and/or a computation device capable of providing data (e.g., web pages, gaming data, e-mail traffic) and/or other information to user devices 110.

Although FIG. 1 shows example components of network 100, in other implementations, network 100 may include fewer components, different components, differently arranged components, and/or additional components than those depicted in FIG. 1. Alternatively, or additionally, one or more components of network 100 may perform one or more other tasks described as being performed by one or more other components of network 100.

Figure 2:
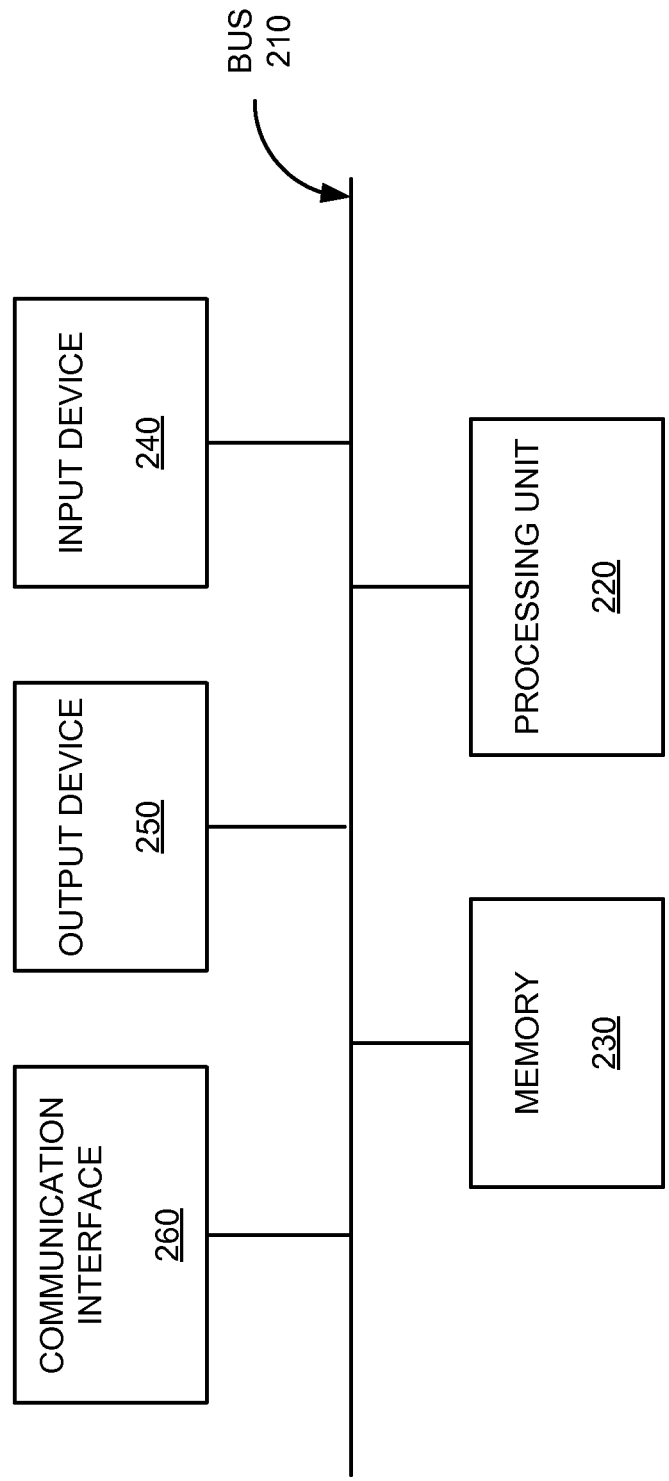
FIG. 2 is a diagram of example components of one or more of the devices of the network depicted in FIG. 1.

FIG. 2 is a diagram of example components of a device 200 that may correspond to one of user device 110, base station 1120, MME 130, network device 140, PCRF server 150, video content provider 170, voice content provider 180, or data provider 190. Each of user device 110, base station 1120, MME 130, network device 140, PCRF server 150, video content provider 170, voice content provider 180, or data provider 190 may include one or more devices 200. As illustrated, device 200 may include a bus 210, a processing unit 220, a memory 230, an input device 240, an output device 250, and a communication interface 260.

Bus 210 may permit communication among the components of device 200. Processing unit 220 may include one or more processors or microprocessors that interpret and execute instructions. In other implementations, processing unit 220 may be implemented as or include one or more application specific integrated circuits (ASICs), field programmable gate arrays (FPGAs), or the like.

Memory 230 may include a random access memory (RAM) or another type of dynamic storage device that stores information and instructions for execution by processing unit 220, a read only memory (ROM) or another type of static storage device that stores static information and instructions for the processing unit 220, and/or some other type of magnetic or optical recording medium and its corresponding drive for storing information or instructions.

Input device 240 may include a device that permits an operator to input information to device 200, such as a keyboard, a keypad, a mouse, a pen, a microphone, a button, a switch, one or more biometric mechanisms, and the like. Output device 250 may include a device that outputs information to the operator, such as a display, a speaker, a light-emitting diode, etc.

Communication interface 260 may include any transceiver-like mechanism that enables device 200 to communicate with other devices and/or systems. For example, communication interface 360 may include mechanisms for communicating with other devices, such as other devices of network 100. In one implementation, communication interface 260 may include an Ethernet interface, an optical interface, or a wireless interface.

As described herein, device 200 may perform certain operations in response to processing unit 220 executing software instructions contained in a computer-readable medium, such as memory 230. A computer-readable medium may be defined as a non-transitory memory device. A memory device may include space within a single physical memory device or spread across multiple physical memory devices. The software instructions may be read into memory 230 from another computer-readable medium or from another device via communication interface 260. The software instructions contained in memory 230 may cause processing unit 220 to perform processes described herein. Alternatively, hardwired circuitry may be used in place of or in combination with software instructions to implement processes described herein. Thus, implementations described herein are not limited to any specific combination of hardware circuitry and software.

Although FIG. 2 shows example components of device 200, in other implementations, device 200 may include fewer components, different components, differently arranged components, or additional components than depicted in FIG. 2. Alternatively, or additionally, one or more components of device 200 may perform one or more other tasks described as being performed by one or more other components of device 200.

Figure 3:
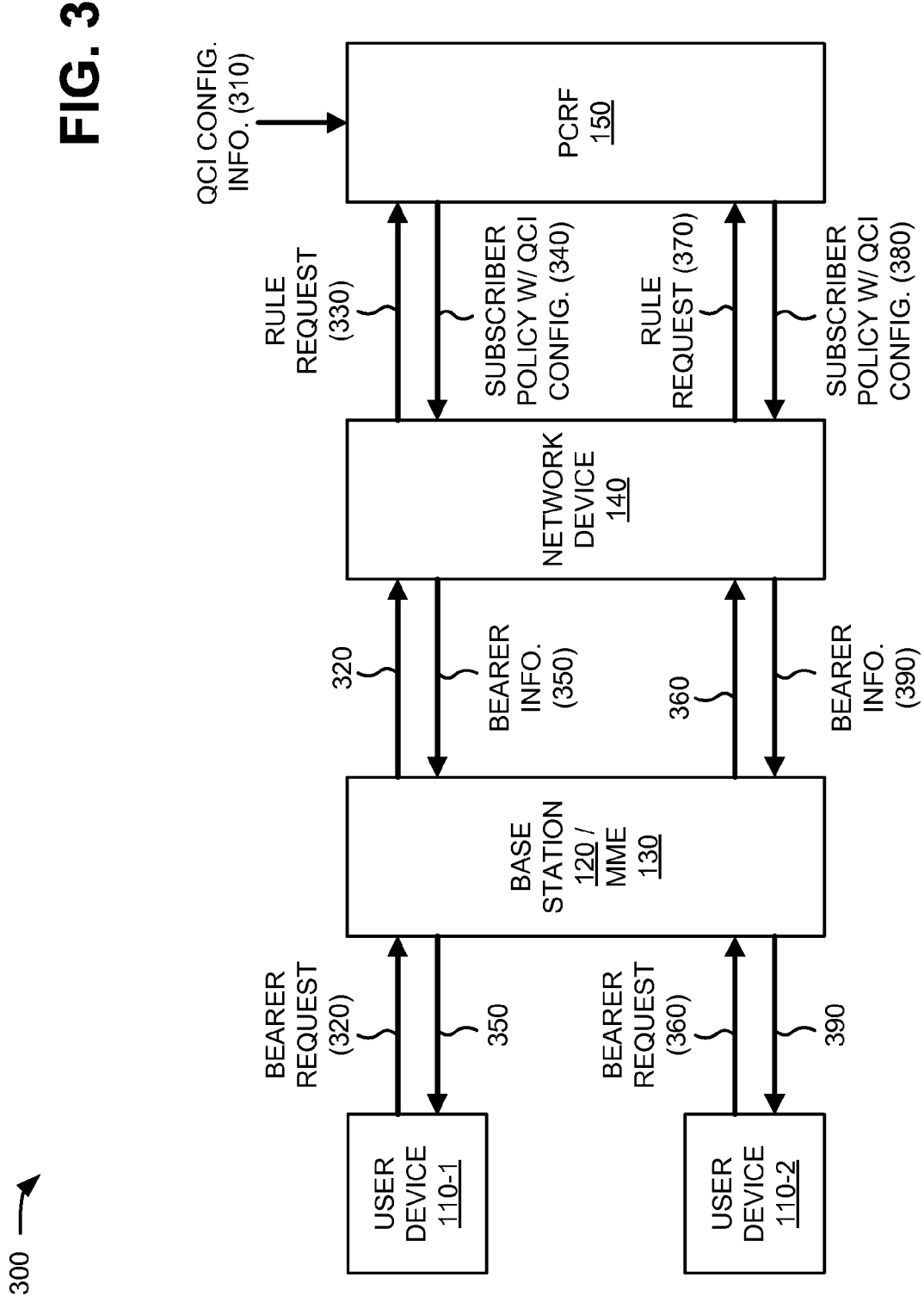
FIG. 3 is a diagram of example interactions between components of an example portion of the network depicted in FIG. 1.

FIG. 3 is a diagram of example interactions between components of an example portion 300 of network 100. As illustrated, example network portion 300 may include user devices 110-1 and 110-2, base station 120/MME 130, network device 140, and PCRF 150. User devices 110-1 and 110-2, base station 120/MME 130, network device 140, and PCRF 150 may include the features described above in connection with one or more of FIGS. 1 and 2.

As shown in FIG. 3, QCI configuration information 310 may be pre-provisioned in PCRF 150 (e.g., by video content provider 170, voice provider 180, data services provider 190, and/or other sources). In one implementation, QCI configuration information 310 may define priorities associated with subscribers of the IP wireless access network (e.g., provided by base station 120, MME 130, and/or network device 140). For example, QCI configuration information 310 may include information associated with subscribers (e.g., users of user devices 110) of video content provider 170, voice provider 180, and/or data services provider 190. For example, QCI configuration information 310 may include, for each application and/or subscriber, a particular QCI value; an uplink QCI configuration that includes an ABR, MBR, and weight factor ($W_i$); and a downlink QCI configuration that includes an ABR, MBR, and weight factor ($W_i$).

A first user (not shown) may utilize user device 110-1 to generate a bearer request 320. For example, the first user may activate an application on user device 110-1 that requires communication with network 160. The first user may have a subscription service that provides particular QoS levels (as indicated by a QCI value) for traffic associated with certain types of applications. User device 110-1 may wirelessly provide bearer request 320 to base station 120/MME 130. Base station 120/MME 130 may forward bearer request 320 to network device 140.

In response to receiving bearer request 320, network device 140 may send a rule request 330 to a particular PCRF 150 that has been selected by network device 140 based on a particular selection rule. For example, in one implementation, network device 140 may send rule request 330 to the nearest PCRF 150. In another implementation, network device 140 may use another technique to select a PCRF (e.g., a round robin technique, a technique that selects PCRF 150 based on the available capacity of the PCRF, etc.).

PCRF 150 may determine particular PCRF parameters relevant to rule request 330, such as QoS information (e.g., a QCI value relevant to rule request 330); an uplink QCI configuration that includes an ABR, MBR, and weight factor ($W_i$); and a downlink QCI configuration that includes an ABR, MBR, and weight factor ($W_i$). In response to rule request 330, PCRF 150 may identify a subscriber policy 340 associated with the user and send subscriber policy 340, including particular PCRF parameters such as the QCI, ABR, MBR, and $W_i$ values, to network device 140.

Network device 140 may implement the received subscriber policy 340. More particularly, network device 140 may install a policy to limit subscriber traffic (e.g., to/from user device 110-1) over a specific bearer (e.g., associated with user device 110-1) defined by the QCI based on the ABR, MBR, and $W_i$ values provided in subscriber policy 340. Network device 140 may provide bearer information (e.g., including the ABR, MBR, and $W_i$ values) to base station 120/MME 130, as indicated by reference number 350. Base station 120/MME 130 may receive bearer information 350 and may forward bearer information 350 to user device 110-1 to activate the bearer between user device 110-1 and a service provider device (e.g., video content provider 170, voice provider 180, and/or data services provider 190).

As further shown in FIG. 3, a second user (not shown) may utilize user device 110-2 to generate a bearer request 360. For example, the second user may activate an application on user device 110-2 that requires communication with network 160. The second user may have a subscription service that provides particular QoS levels (as indicated by a QCI value), different than those of the first user, for traffic associated with certain types of applications. User device 110-2 may wirelessly provide bearer request 360 to base station 120/MME 130. Base station 120/MME 130 may forward bearer request 360 to network device 140 which may be the same (as shown in FIG. 3) or a different network device 140 than described above with respect to rule request 320.

In response to receiving bearer request 360, network device 140 may send a rule request 370 to a particular PCRF 150 that has been selected by network device 140 based on a particular selection rule. For example, network device 140 may send rule request 370 to the nearest PCRF 150, which may be the same (as shown in FIG. 3) or a different PCRF 150 than described above with respect to rule request 330. PCRF 150 may determine particular PCRF parameters relevant to rule request 370, such as QoS information (e.g., a QCI value relevant to rule request 370); an uplink QCI configuration that includes an ABR, MBR, and weight factor ($W_i$); and a downlink QCI configuration that includes an ABR, MBR, and weight factor ($W_i$). In response to rule request 370, PCRF 150 may identify a subscriber policy 380 and send subscriber policy 380, including particular PCRF parameters such as the QCI, ABR, MBR, and $W_i$ values, to network device 140.

Network device 140 may implement the received subscriber policy 380. More particularly, network device 140 may install a policy to limit subscriber traffic (e.g., to/from user device 110-2) over a specific bearer (e.g., associated with user device 110-2) defined by the QCI based on the ABR, MBR, and $W_i$ values provided in subscriber policy 380. Network device 140 may provide bearer information (e.g., including the ABR, MBR, and $W_i$ values) to base station 120/MME 130, as indicated by reference number 390. Base station 120/MME 130 may receive bearer information 390 and may forward bearer information 390 to user device 110-2 to activate the bearer between user device 110-2 and a service provider device (e.g., video content provider 170, voice provider 180, and/or data services provider 190).

In a multiple access network (e.g., such as network portion 300), different application services (e.g., video, voice, and/or other data) may compete for the same air interface and transport network resources (e.g., base station 120, MME 130, and/or network device 140). Base station 120 may monitor resource utilization information of the IP wireless access network. During periods of congestion (e.g., where the air interface and transport network resources cannot simultaneously meet all demands), base station 120 may allocate bandwidth to different users (e.g., user devices 110-1 and 110-2) based on the QoS settings associated with each respective bearer. For example, as described further below, base station 120 may allocate available uplink bandwidth among competing bearers based on the uplink weight factor, $W_i$, for each QCI value. Similarly, base station 120 may schedule downlink traffic among competing bearers based on the downlink weight factor, $W_i$, for each QCI value. Furthermore, user device 110, base station 120, and network device 140 may apply the uplink/downlink ABR and uplink/downlink MBR to provide traffic shaping and scheduling functions. Base station 120 may also control admission to the wireless access network based on resource utilization information and ABR values associated with particular bearers.

Although FIG. 3 shows example components of network portion 300, in other implementations, network portion 300 may include fewer components, different components, differently arranged components, and/or additional components than depicted in FIG. 3. Alternatively, or additionally, one or more components of network portion 300 may perform one or more other tasks described as being performed by one or more other components of network portion 300.

Figure 4:
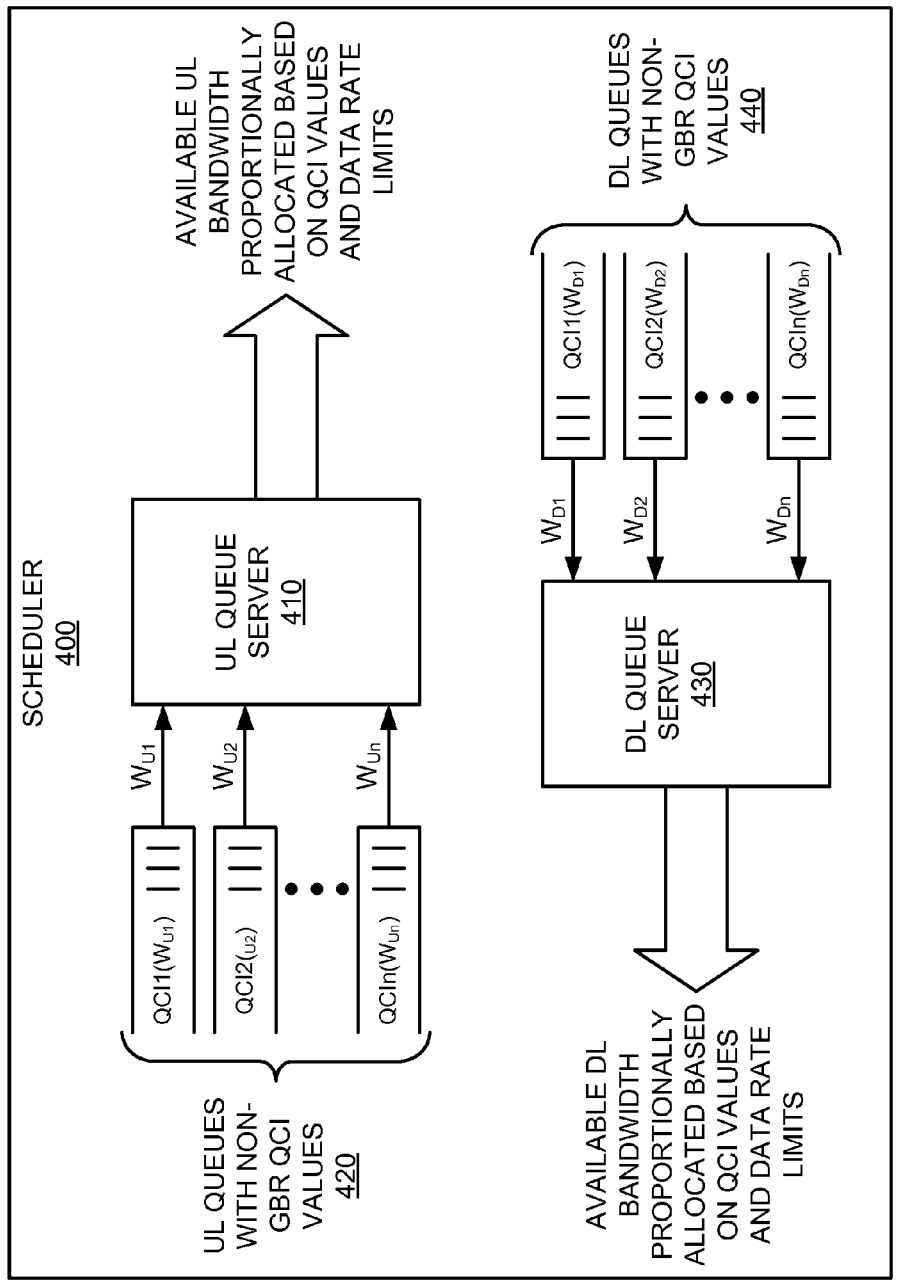
FIG. 4 is a diagram of example functional components of a base station of the network illustrated in FIG. 1.

FIG. 4 is a diagram of example functional components of base station 120. In one implementation, the functions described in connection with FIG. 4 may be performed by one or more components of device 200 (FIG. 2) or one or more devices 200. As shown in FIG. 4, base station 120 may include a scheduler 400 that includes an uplink (UL) queue server 410 servicing multiple uplink queues 420, and a downlink (DL) queue server 430 servicing multiple downlink queues 440.

Scheduler 400 may include hardware or a combination of hardware and software to schedule downlink and uplink transmissions between user devices 110 and base station 120 over a wireless IP network. Scheduler 400 may also allocate physical layer (e.g., media access control (MAC) layer) resources to be used. Scheduler 400 may apply scheduling algorithms which determine what traffic gets sent and/or when the traffic gets sent. Scheduler 400 may generally be responsible for implementing QoS characteristics assigned to radio bearers (e.g., as defined in bearer information 350 and 390).

Scheduler 400 may include UL queue server 410. UL queue server 410 may service queues 420 with traffic directed from user devices 110. Each queue, of queues 420, may include traffic associated with a different QCI value and weight value (e.g., "QCI1($W_{U1}$)," "QCI2($W_{U2}$)," ..., "QCIn ($W_{Un}$)"). For example, each one of queues 420 may represent one of the non-GBR QCI values (e.g., 5-9) corresponding to the DSCP model. During periods of congestion, UL queue server 410 may allocate certain amounts of bandwidth for queues 420 based on available uplink bandwidth (e.g., for non-GBR traffic) and a $W_{ui}$ value associated with each queue. The $W_{Ui}$ value may correspond to uplink $W_i$ values received, for example, from network device 140 via bearer information 350 and 390.

UL queue server 410 may apply a bandwidth weight factor, $W_{Ui}$, to each active queue of queues 420 to determine an uplink bandwidth allocation for each QCI value. In one implementation, the uplink bandwidth allocation may be calculated as:

$$BWQCI_i = \frac{W_{Ui}}{W_{U1} + W_{U2} + \ldots + W_{Un}}$$

where BW QCI may represent the bandwidth allocation fraction, Ui may represent a particular uplink queue, and n may represent the total number of active queues in the particular uplink queue group. The weight factor, $W_{Ui}$, may be used to determine bandwidth allocations for a particular class of traffic and then apportioned among individual user devices 110 to ensure that the bandwidth is allocated in proportion to the weight allocated to each class of service (e.g., as identified by the weight value for each QCI). Each user device 110 may have uplink traffic for multiple QCI values. Calculation of the uplink bandwidth allocation may be determined by scheduler 400 without knowledge of user devices 110. Base station 120 may provide, to each user device 110, an uplink bandwidth allocation based on the particular bandwidth allocation fraction, the total available bandwidth, the number of bearers with the particular QCI value, and/or other QoS policy criteria.

As further shown in FIG. 4, scheduler 400 may include DL queue server 430. DL queue server 430 may service queues 440 with traffic directed to user devices 110. Each queue, of queues 440, may include traffic associated with a different QCI value and weight value (e.g., "QCI1($WD_{D1}$)," "QCI2 ($W_{D2}$)," ..., "QCIn($W_{Dn}$)"). For example, each one of queues 440 may represent one of the non-GBR QCI values (e.g., 5-9) corresponding to the DSCP model. During periods of congestion, DL queue server 430 may allocate certain amounts of bandwidth for queues 440 based on available downlink bandwidth (e.g., for non-GBR traffic) and a $W_{Di}$ value associated with each queue. The $W_{Di}$ value may correspond to downlink $W_i$ values received, for example, from network device 140 via bearer information 350 and 390.

DL queue server 430 may apply a bandwidth weight factor, $W_{Di}$, to each active queue of queues 440 to determine a downlink bandwidth allocation for each QCI value. Similar to the calculation for uplink traffic above, in one implementation, the downlink bandwidth allocation may be calculated as:

$$BWQCI_i = \frac{W_{Di}}{W_{D1} + W_{D2} + \ldots + W_{Dn}}$$

where BW QCI may represent the bandwidth allocation fraction, Di may represent a particular queue, and n may represent the total number of active queues in the particular downlink queue group. The weight factor, $W_{Di}$, may be used to determine bandwidth allocations for a particular class of traffic and then apportioned among individual user devices 110 to ensure that the bandwidth is allocated in proportion to the weight allocated to each class of service (e.g., as identified by the weight value for each QCI). Downlink traffic with multiple QCI values may be directed to the same user device 110.

Base station 120 may provide, for each queue 440, a downlink bandwidth allocation based on the particular bandwidth allocation fraction, the total available bandwidth, the number of bearers with the particular QCI value, and/or other QoS policy criteria. As an example, assume a congested network with traffic for downlink queues QCI5, QCI6, and QCI7 having weight factors of W5=1, W6=2, and W7=3. Further assume that the sector capacity (e.g., associated with base station 120) for non-GBR traffic is 16 Mbps shared between the three queues. Applying the downlink scheduling method above, the downlink bandwidth for each of queues QCI5, QCI6, and QCI7 would be scheduled as 10 Mbps, 4 Mbps, and 2 Mbps, respectively.

Although FIG. 4 shows example functional components of base station 120, in other implementations, base station 120 may contain different functional components, differently arranged functional components, or additional functional components than depicted in FIG. 4. Alternatively, or additionally, one or more functional components of base station 120 may perform one or more other tasks described as being performed by one or more other functional components of base station 120.

Figure 5:
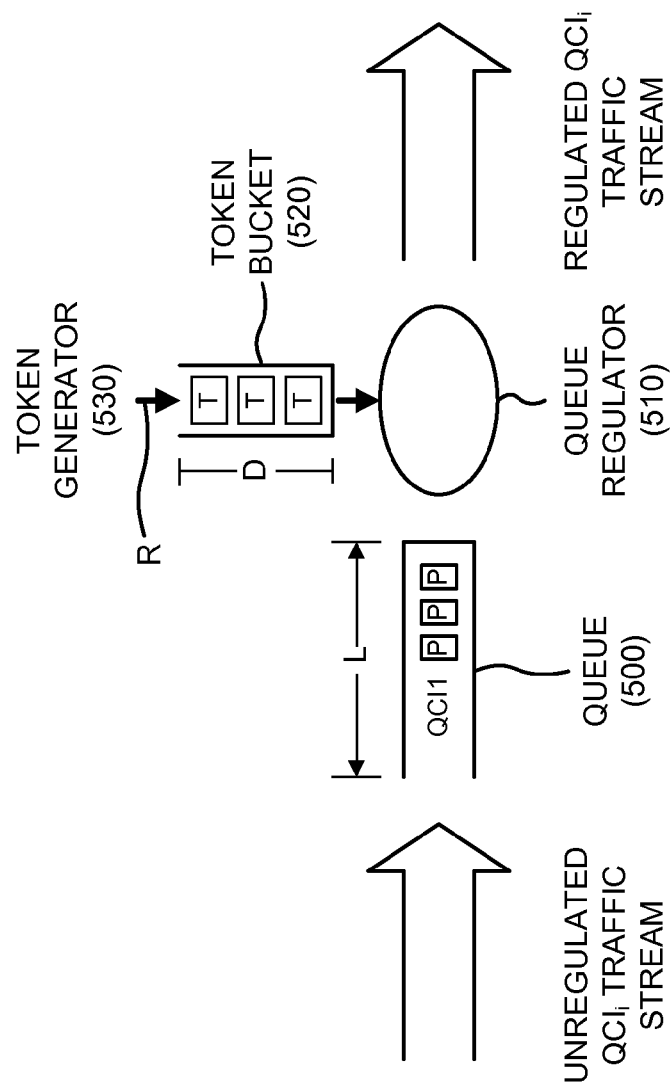
FIG. 5 is a diagram of example functional components of a user device or a network device illustrated in FIG. 1.

FIG. 5 is a diagram of example functional components of user device 110 or network device 140 illustrated in FIG. 1. The functional components in FIG. 5 may be used to apply rate limiting of traffic over an air interface of an IP wireless access network. For example, uplink rate limiting may be performed by user device 110, and downlink rate limiting may be performed by network device 140. In one implementation, the functions described in connection with FIG. 5 may be performed by one or more components of device 200 (FIG. 2).

In one implementation, user device 110 or network device 140 may employ a token bucket rate-limiting mechanism to enforce a long-term average transmission rate (e.g., an ABR associated with a particular QCI) while permitting bounded bursts (e.g., up to a MBR). The ABR and MBR values associated with each QCI may be provided to user device 110 and network device 140 from PCRF 150 (e.g., via subscriber policy 340 and/or bearer information 350 of FIG. 3). In this approach, a queue 500 that includes uplink or downlink traffic to be rate limited may be serviced by a queue regulator 510. A token bucket 520 may be used to manage queue regulator 510 to control the rate of uplink/downlink traffic flow from queue 500 (e.g., over the air interface of an IP wireless access network).

A token generator 530 may constantly produce tokens at a rate of R tokens per second (e.g., where R is based on the ABR associated with queue 500) and may place the tokens into token bucket 520 with a depth of D tokens (e.g., where D is based on the MBR associated with queue 500). Assuming that each token grants the ability to transmit a fixed number of bytes from queue 500, if token bucket 520 fills, newly generated tokens may be discarded. At the same time, an unregulated stream of packets may arrive and be placed into queue 500 that has a maximum length of L. If the unregulated stream delivers more packets than queue 500 can store, the excess packets may be dropped. For example, in one implementation, excess packets may be dropped based on a random early detection (RED) method, a weighted RED method, or another method.

Queue regulator 510 may consider a number of factors when deciding whether a packet of size P tokens can be forwarded into the uplink/downlink traffic flow. If token bucket 520 is full, the packet may be forwarded into the network and P tokens may be removed from token bucket 520. If token bucket 520 is empty, the next packet in queue 500 may wait at the head of queue 500 until P tokens are generated and placed in token bucket 520. When token bucket 520 eventually contains P tokens, that many tokens can be removed from token bucket 520 and the packet is sent into the uplink/downlink traffic flow. Finally, assume that token bucket 520 is only partially full and contains T tokens. If P is less than or equal to T, P tokens can be removed from token bucket 520 and the packet may be forwarded into the uplink/downlink traffic flow. If P is greater than T, the packet may wait for the remaining P minus T tokens before it can be sent into the uplink/downlink traffic flow. When token bucket 520 contains the required P tokens, that many tokens may be removed from token bucket 520 and the packet may be forwarded from queue 500 into the uplink/downlink traffic flow.

The configuration shown in FIG. 5 can be used to regulate the long-term average transmission rate (e.g., the uplink or downlink ABR associated with a particular QCI value) while still permitting bursts of a predetermined size (e.g., the uplink or downlink MBR associated with the particular QCI value). The rate, R, of token generator 530 may define the long-term average traffic rate; the depth, D, of token bucket 520 may define the maximum burst size that queue regulator 510 may allow; and the length, L, of packet queue 500 may bound the amount of delay that a packet can incur at queue regulator 510. The configuration shown in FIG. 5 may be used to regulate flow of GBR and non-GBR traffic (e.g., as defined by a QCI value associated with a particular bearer). This configuration may allow bursts of data to quickly pass without introducing large latency/jitter into the network, and may be particularly well-suited for variable bit rate traffic such as video telephony and/or video streaming.

While the functional components of FIG. 5 employ a leaky bucket mechanism to apply ABR and MBR values, in other implementations, a different regulating mechanism may be used. For example, although FIG. 5 shows example functional components of user device 110 or network device 140, in other implementations, user device 110 or network device 140 may contain different functional components, differently arranged functional components, or additional functional components than depicted in FIG. 5. Alternatively, or additionally, one or more functional components of user device 110 or network device 140 may perform one or more other tasks described as being performed by one or more other functional components of user device 110 or network device 140.

Figure 6:
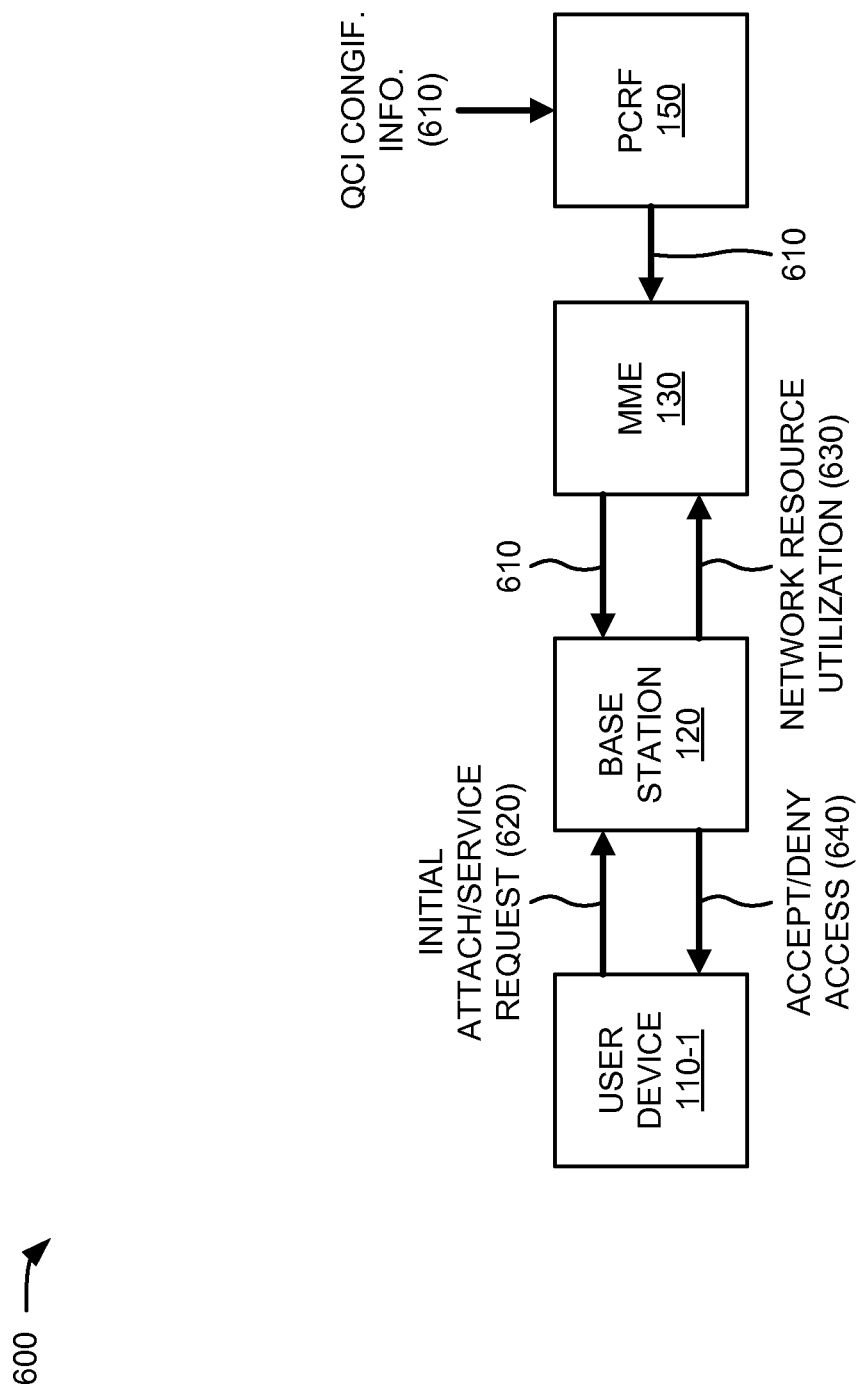
FIG. 6 is a diagram of example interactions between components of another example portion of the network illustrated in FIG. 1.

FIG. 6 is a diagram of example interactions between components of another example portion 600 of network 100. The interactions in FIG. 6 may demonstrate admissions control over an air interface of an IP wireless access network. Currently, for non-GBR bearers (e.g., QCI 5-9), there are no parameters associated with guaranteed bandwidth, so admission control is not performed. In contrast, according to implementations described herein, admission control for non-GBR bearers may be based on the ABR value. The ABR value may be used by base station 120 and/or MME 130 for admission control, and bearer creation may be denied if the number of bearers has reached a particular threshold value. As illustrated, example network portion 600 may include user device 110-1, base station 120, MME 130, and PCRF 150. User device 110-1, base station 120, MME 130, and PCRF 150 may include the features described above in connection with one or more of FIGS. 1-5.

As shown in FIG. 6, QCI configuration information 610 may be pre-provisioned in PCRF 150 (e.g., by video content provider 170, voice provider 180, data services provider 190, and/or other sources). In one implementation, QCI configuration information 610 may include, for each application and/or subscriber (e.g., users of user devices 110), a particular QCI value; an uplink QCI configuration that includes an ABR; and a downlink QCI configuration that includes an ABR. PCRF 150 may provide QCI configuration information 610 to base station 120 and/or MME 130. Alternatively, or additionally, PCRF 150 may provide QCI configuration information 610 to MME 130, and MME 130 may provide QCI configuration information 610 to base station 120.

As further shown in FIG. 6, a user (not shown) may utilize user device 110-1 to attempt to initially attach to the IP wireless access network (e.g., provided by base station 120 and/or MME 130) and/or to request an application service (e.g., provided by video content provider 170, voice provider 180, data services provider 190, and/or another source), as indicated by reference number 620 (initial attach/service request 620). Base station 120 may monitor network resource utilization information 630 associated with the IP wireless access network (e.g., provided by base station 120 and/or MME 130). Network resource utilization information 630 may include resource utilization of base station 120, such as radio utilization of base station 120 by user devices 110, a load placed on base station 120 by user devices 110 (e.g., due to the number of user devices 110 attached to base station 120 and services utilized by the attached user devices 110), etc. When the user (e.g., via user device 110-1) provides initial attach/service request 620 to base station 120, base station 120 may detect initial attach/service request 620 and may provide network resource utilization information 630 (e.g., for the wireless access network) to MME 130. Alternatively, or additionally, base station 120 may periodically report network resource utilization information 630 to MME 130 (e.g., absent initial attach/service request 620).

Base station 120 may determine whether to accept or deny initial attach/service request 620 based on QCI configuration information 610 and/or network resource utilization information 630. For example, base station 120 may determine whether to accept or deny initial attach/service request 620 of user device 110-1 based on radio usage patterns (e.g., by other user devices 110 associated with base station 120), the uplink/downlink ABR (e.g., associated with the QCI) from QCI configuration information 610, priorities associated with users of the other user devices 110 associated with base station 120, etc. If initial attach/service request 620 is denied (e.g., based on the determination and as indicated by reference number 640), base station 120 and/or MME 130 may determine and provide, to user device 110-1, a time to attempt a re-attach to the IP wireless access network and/or re-request the application service (e.g., based on network resource utilization information 630). This may ensure that user device 110-1 does not keep trying to continuously attach to the IP wireless access network and create further network congestion problems. If initial attach/service request 620 is accepted (e.g., based on the determination and as indicated by reference number 640), base station 120 may permit user device 110-1 to access the IP wireless access network and/or obtain the requested application service.

Although FIG. 6 shows example components of network portion 600, in other implementations, network portion 600 may include fewer components, different components, differently arranged components, and/or additional components than depicted in FIG. 6. Alternatively, or additionally, one or more components of network portion 600 may perform one or more other tasks described as being performed by one or more other components of network portion 600.

Figure 7:
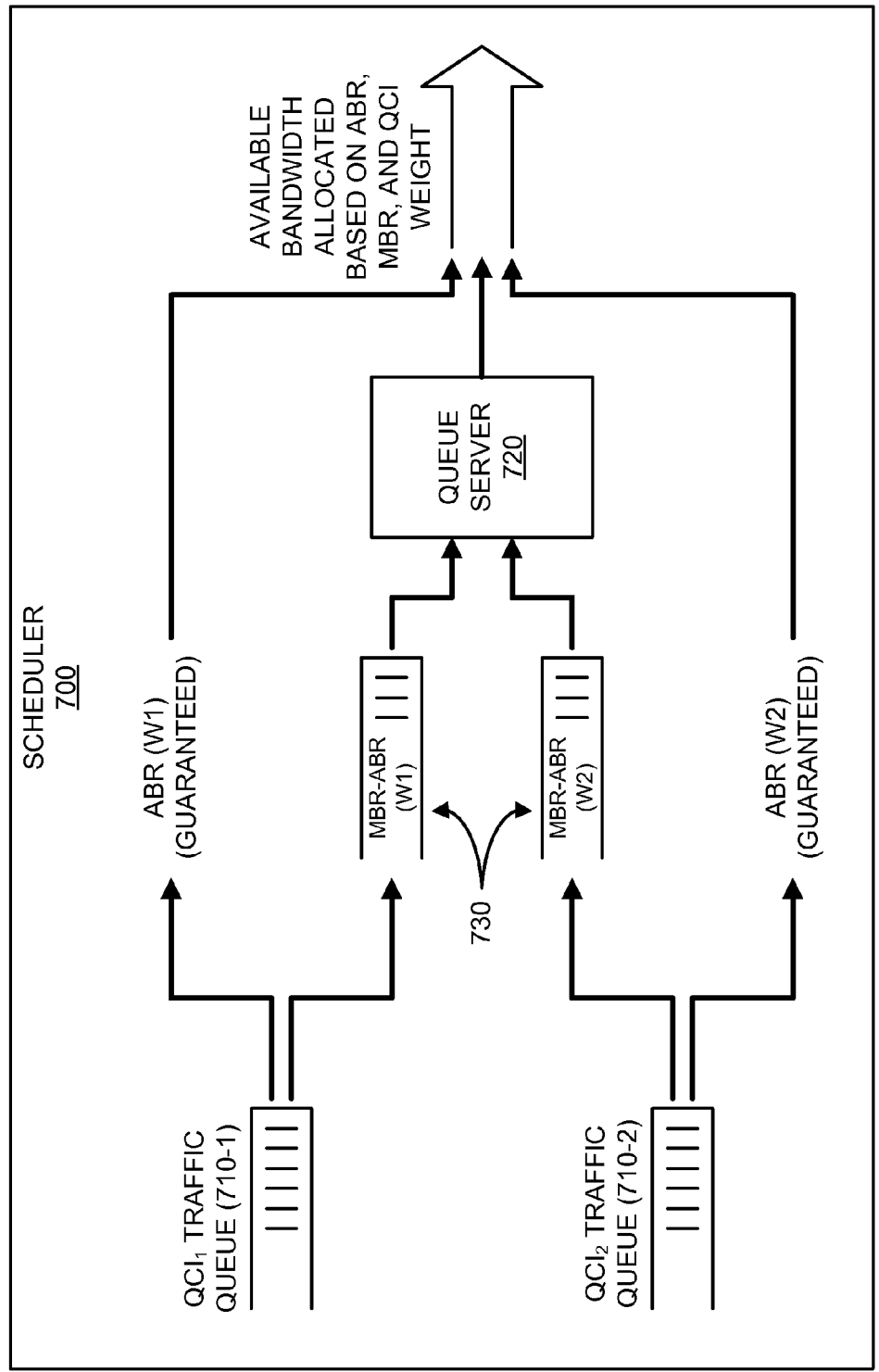
FIG. 7 is another diagram of example functional components of the base station illustrated in FIG. 1.

FIG. 7 is a diagram of example functional components of base station 120 according to another implementation described herein. The functions described in connection with FIG. 7 may be performed, for example, by one or more components of device 200 (FIG. 2) or one or more devices 200. As shown in FIG. 7, base station 120 may include a scheduler 700 that services multiple QCI-specific queues 710. Scheduler 700 may also include a queue server 720 servicing multiple sub-queues 730. Although two QCI-specific queues 710 and two sub-queues 730 are shown in FIG. 7 for simplicity, in other configurations more QCI-specific queues 710 and sub-queues 730 may be included in scheduler 700 (e.g., based on the number of active bearers and/or QCI values associated with base station 120).

When ABR and MBR are configured for a specific bearer (e.g., associated with QCI$_1$ traffic queue 710-1 or QCI$_2$ traffic queue 710-2), scheduler 700 may guarantee the ABR associated with the bearer, and the rest of the traffic (e.g., the MBR bandwidth minus the guaranteed ABR bandwidth) may be directed to one of sub-queues 730. Traffic in sub-queues 730 may receive priority treatment similar to that described in connection with FIG. 4. That is, queue server 720 may apply a bandwidth weight factor, $W_i$, to each active sub-queue of sub-queues 730 to determine a bandwidth allocation for each QCI value. In one implementation, the bandwidth allocation may be calculated as:

$$BW MBR - ABR(W_i) = \frac{W_i}{W_1 + W_2 + \ldots + W_n}$$

where BW MBR-ABR($W_i$) may represent the bandwidth allocation fraction allotted to one sub-queue 730, i may represent a particular sub-queue, and n may represent the total number of active sub-queues 730 in the particular queue group. Implementations described in connection with FIG. 7 may be applied to either downlink traffic (e.g., received at base station 120 from network device 140) or uplink traffic (e.g., from user devices 110). Furthermore, the downlink/ uplink bandwidth allocations may apply to both GBR and non-GBR bearer traffic.

Although FIG. 7 shows example functional components of base station 120, in other implementations, base station 120 may contain different functional components, differently arranged functional components, or additional functional components than depicted in FIG. 7. Alternatively, or additionally, one or more functional components of base station 120 may perform one or more other tasks described as being performed by one or more other functional components of base station 120.

Figure 8:
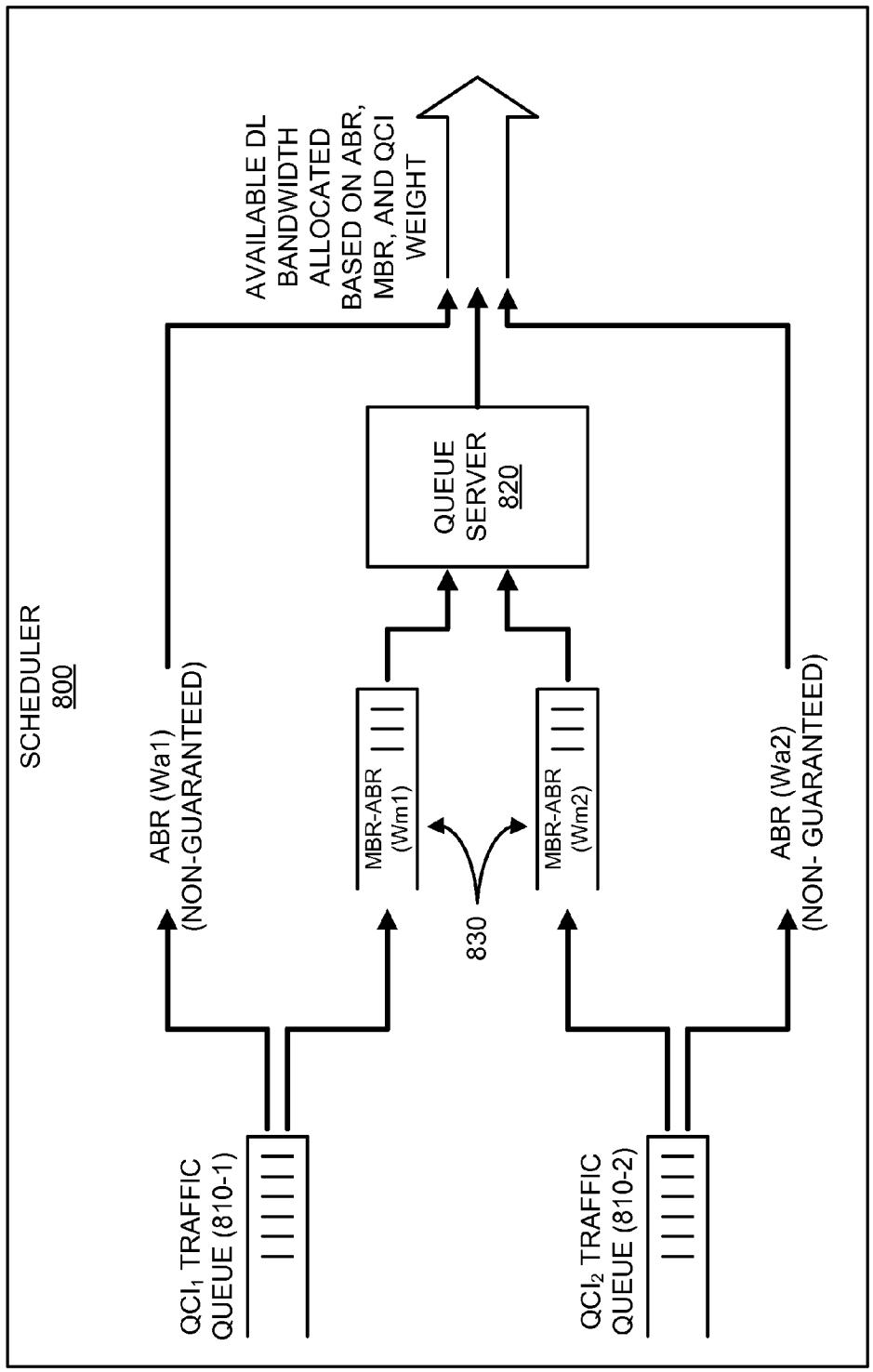
FIG. 8 is a further diagram of example functional components of the base station device illustrated in FIG. 1.

FIG. 8 is a diagram of example functional components of base station 120 according to still another implementation described herein. The functions described in connection with FIG. 8 may be performed, for example, by one or more components of device 200 (FIG. 2) or one or more devices 200.

Functions described in connection with FIG. 8 may rely on a further distinction of the weight factor, $W_i$, described above in connection with FIG. 3. Instead of a single $W_i$ value for uplink and/or downlink traffic, PCRF 150 may be configured to provide a weight factor associated with ABR called $W_{ai}$ and another weight factor associated with MBR called $W_{mi}$, where i represents the QCI value. The weight factors, $W_{ai}$ and $W_{mi}$, may be provided to network device 140, MME 130, and/or base station 120 as part of PCRF parameters included in subscriber policy 340 (e.g., FIG. 3).

As shown in FIG. 8, base station 120 may include a scheduler 800 that services multiple QCI-specific queues 810. Scheduler 800 may also include a queue server 820 servicing multiple sub-queues 830. Although two QCI-specific queues 810 and two sub-queues 830 are shown in FIG. 8 for simplicity, in other configurations more QCI-specific queues 810 and sub-queues 830 may be included in scheduler 800 (e.g., based on the number of active bearers and/or QCI values associated with base station 120).

When ABR and MBR are configured for a specific bearer (e.g., associated with QCI$_1$ traffic queue 810-1 or QCI$_2$ traffic queue 810-2), scheduler 800 may schedule the ABR associated with the bearer based on the weight factors, $W_{ai}$ (e.g., during periods of network congestion). Traffic in QCI-specific queues 810 may receive priority treatment similar to that described in connection with FIG. 7. That is, scheduler 800 may apply the ABR bandwidth weight factor, $W_{ai}$, to each active queue of QCI-specific queues 810 to determine a bandwidth allocation for each QCI value. In one implementation, the ABR bandwidth allocation may be calculated as:

$$BW ABR(W_{ai}) = \frac{W_{ai}}{W_{a1} + W_{a2} + \ldots + W_{an}}$$

where BW ABR($W_{ai}$) may represent the bandwidth allocation fraction allotted to one QCI-specific queues 810, i may represent a particular QCI-specific queues 810, and n may represent the total number of active QCI-specific queues 810 in the particular queue group.

The rest of the traffic from QCI-specific queue 810 (e.g., the MBR bandwidth minus the scheduled ABR bandwidth) may be directed to one of sub-queues 830. Queue server 820 may apply the MBR bandwidth weight factor, $W_{mi}$, to each active sub-queue of sub-queues 830 to determine a bandwidth allocation for each QCI value. In one implementation, the bandwidth allocation may be calculated as:

$$BW MBR - ABR(W_{mi}) = \frac{W_{mi}}{W_{m1} + W_{m2} + \ldots + W_{mn}}$$

where BW MBR-ABR($W_{mi}$) may represent the bandwidth allocation fraction allotted to one sub-queue 830, i may represent a particular sub-queue 830, and n may represent the total number of active sub-queues 830 in the particular queue group. Implementations described in connection with FIG. 8 may be applied to either downlink non-GBR bearer traffic (e.g., received at base station 120 from network device 140) or uplink non-GBR bearer traffic (e.g., from user devices 110).

Although FIG. 8 shows example functional components of base station 120 to implement separate weight factors, $W_{ai}$ and $W_{mi}$, in other implementations, base station 120 may contain different functional components, differently arranged functional components, or additional functional components than depicted in FIG. 8. Alternatively, or additionally, one or more functional components of base station 120 may perform one or more other tasks described as being performed by one or more other functional components of base station 120.

Figure 9:
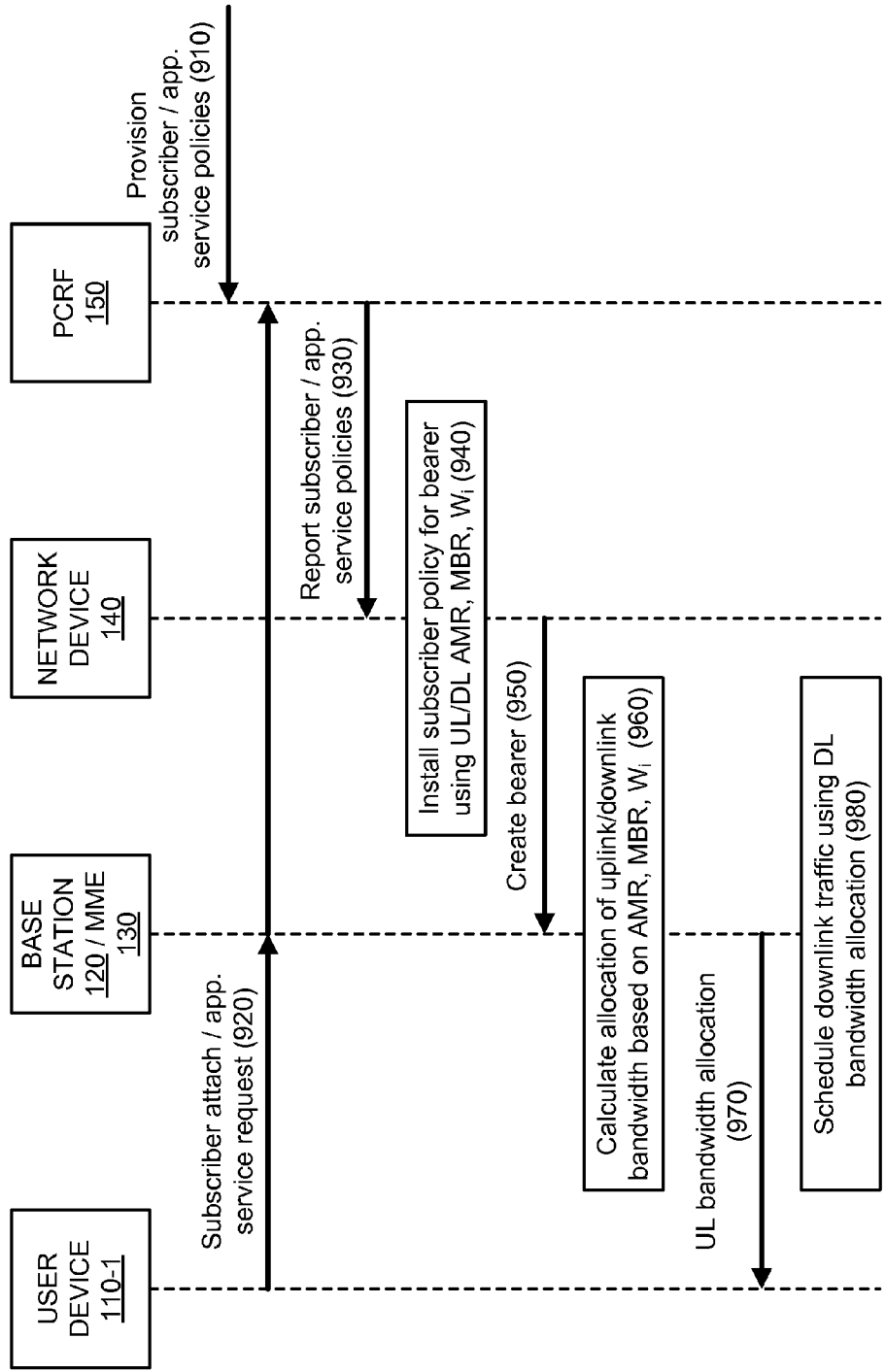
FIG. 9 is a flow diagram of example interactions between components of still another example portion of the network depicted in FIG. 1.

FIG. 9 is a flow diagram of example interactions between components of another example portion 900 of network 100.

As illustrated, example network portion 900 may include user device 110-1, base station 120/MME 130, network device 140, and PCRF 150. User device 110-1, base station 120, MME 130, network device 140, and PCRF 150 may include the features described above in connection with one or more of FIGS. 1-8.

As further shown in FIG. 9, subscriber and/or application service priorities may be pre-provisioned in PCRF 150 (e.g., by service providers, network resources, and/or other sources), as indicated by reference number 910. Subscriber/application service policy configurations 910 may include information associated with subscribers (e.g., users of user devices 110). For example, subscriber/application service policy configurations 910 may include subscriber service plan information (e.g., whether subscribers subscribe to premium services or less than premium services, data plans of subscribers, etc.); subscriber hardware information (e.g., what type(s) of user devices 110 are utilized by subscribers, capabilities of such user devices 110, etc.); priorities associated with the subscribers (e.g., whether one subscriber has a higher priority over another subscriber); etc. In one implementation, subscriber policy configuration 910 may include a particular QCI value (e.g., associated with a subscriber and/or application); an uplink QCI configuration that includes an ABR, MBR, and weight factor ($W_i$); and a downlink QCI configuration that includes an ABR, MBR, and weight factor ($W_i$). In another implementation, each weight factor ($W_i$) in subscriber policy configuration 910 may be replaced with a separate ABR weight factor ($W_{ai}$) and a separate MBR weight factor ($W_{mi}$).

A user (not shown) may utilize user device 110-1 to attempt to initially attach to the IP wireless access network (e.g., provided by base station 120, MME 130, and/or network device 140), as indicated by reference number 920 (subscriber attach request 920). Alternatively, if user device 110-1 is attached to the IP wireless access network, the user may utilize user device 110-1 to request an application service, as further indicated by reference number 920 (application service request 920). When the user (e.g., via user device 110-1) provides subscriber attach/application service request 920 to base station 120/MME 130, base station 120/MME 130 and/or network device 140 may cause PCRF 150 to report subscriber/application service policies 910 to network device 140, as indicated by reference number 930. The subscriber/application service policies 930 may include, for example, a particular QCI value; an uplink QCI configuration that includes an ABR, MBR, and weight factor ($W_i$); and a downlink QCI configuration that includes an ABR, MBR, and weight factor ($W_i$). Alternatively, the subscriber/application service policies 930 may include, a particular QCI value; an uplink QCI configuration that includes an ABR, MBR, an ABR weight factor ($W_{ai}$), and an MBR weight factor ($W_{mi}$); and a downlink QCI configuration that includes an ABR, MBR, an ABR weight factor ($W_{ai}$), and an MBR weight factor ($W_{mi}$).

Network device 140 may receive subscriber/application service policies 930 and may install a subscriber policy for a bearer using the uplink and downlink ABR(s), MBR(s), and weight factor(s) ($W_i$), as indicated by reference number 940. Network device 140 may provide the policy for the bearer to base station 120/MME 130, as indicated by reference number 950. Base station 120/MME 130 may receive the policy and may calculate bandwidth allocations for the bearer based on the uplink ABR, MBR, and weight factor ($W_i$); the downlink ABR, MBR, and weight factor ($W_i$); and other information in bearer policy 950, as indicated by reference number 960. For example, base station 120/MME 130 may monitor network resource utilization information associated with the IP wireless access network and determine if QoS measures should be applied to manage network congestion. If congestion exists, base station 120/MME 130 may calculate an uplink bandwidth allocation based on the QCI value, the ABR, the MBR, and/or the weight factor ($W_i$) for the requested bearer. Base station 120/MME 130 may also calculate a downlink bandwidth allocation based on QCI value, the ABR, the MBR, and/or the weight factor ($W_i$) for the requested bearer.

Base station 120/MME 130 may inform user device 110-1 of the bearer grant and that particular uplink bandwidth is allocated for the bearer, as indicated by reference number 970. User device 110-1 may use the uplink bandwidth allocation to regulate traffic in accordance with QoS policy and in proportion to the uplink ABR, MBR, and weight factor ($W_i$) for the particular QCI value associated with the bearer. Base station 120/MME 130 may also apply rate limiting to schedule downlink traffic using the calculated downlink bandwidth, as indicated by reference number 980.

Although FIG. 9 shows example components of network portion 900, in other implementations, network portion 900 may include fewer components, different components, differently arranged components, and/or additional components than depicted in FIG. 9. Alternatively, or additionally, one or more components of network portion 900 may perform one or more other tasks described as being performed by one or more other components of network portion 900.

Figure 10:
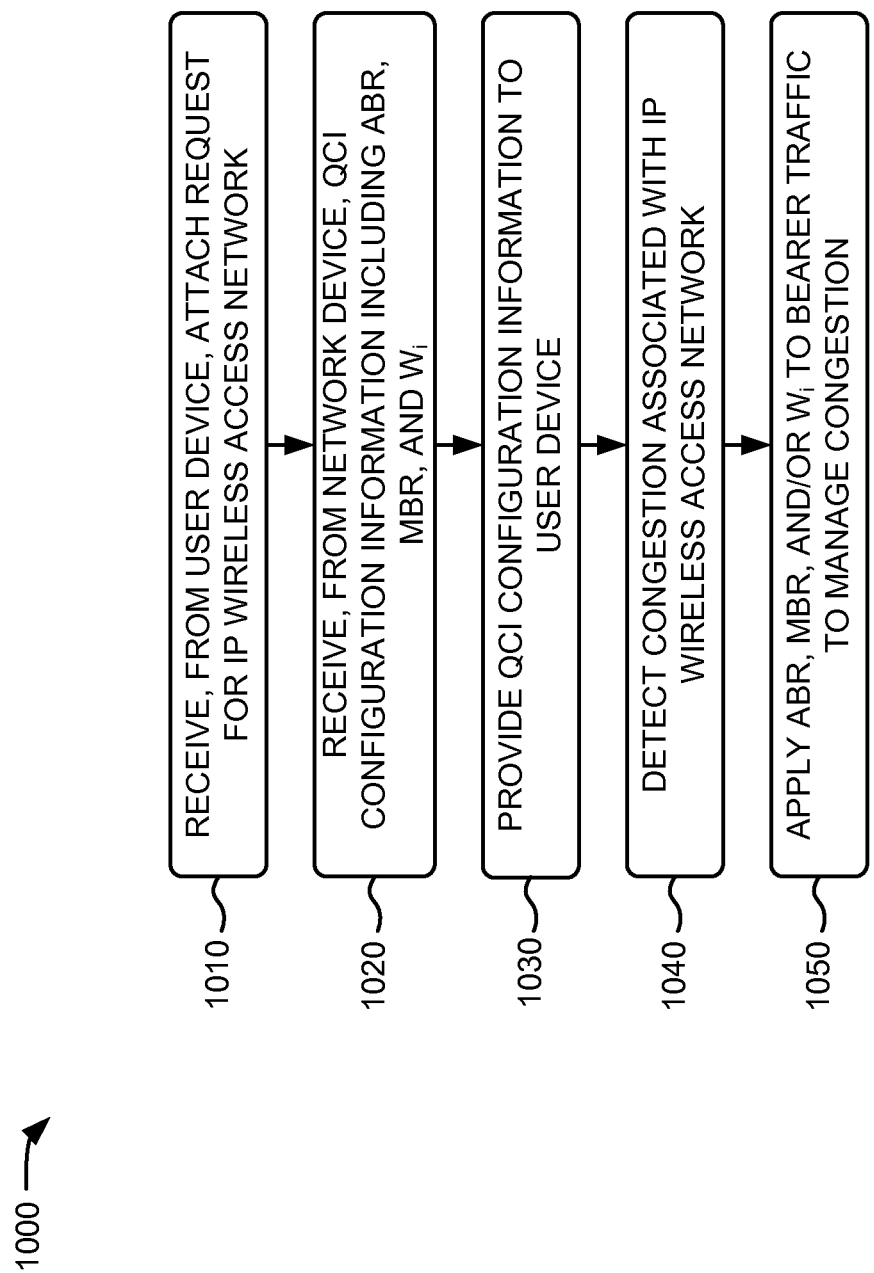
FIGS. 10 and 11 are flow charts of an example process for providing subscriber and/or service differentiation in a wireless access network according to an implementation described herein.
Figure 11:
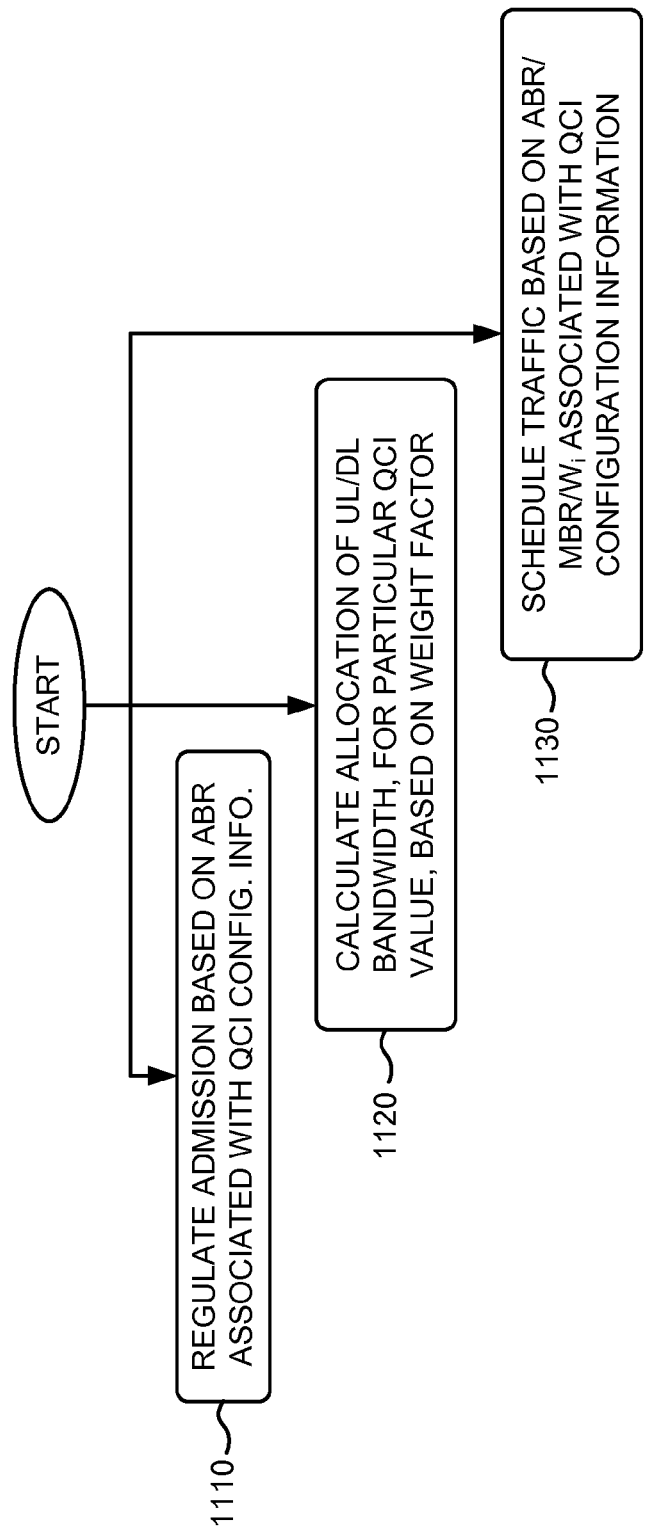

FIGS. 10-11 are flow charts of an example process 1000 for providing subscriber and/or service differentiation in a wireless access network according to an implementation described herein. In one implementation, process 1000 may be performed by base station 120. In another implementation, some or all of process 1000 may be performed by another device or group of devices, including or excluding base station 120.

As illustrated in FIG. 10, process 1000 may include receiving, from a user device, an attach request for an IP wireless access network (block 1010), and receiving, from a network device, QCI configuration information including an ABR, an MBR, and a weight factor ($W_i$) (block 1020). For example, in implementations described above in connection with FIG. 3, a user may activate an application on user device 110-1 that requires communication with network 160. The user may have a subscription service that provides particular QoS levels (as indicated by a QCI value) for traffic associated with certain types of applications. User device 110-1 may wirelessly provide bearer request 320 to base station 120/MME 130. In response to bearer request 320, PCRF 150 may send a subscriber policy 340, including particular PCRF parameters such as QCI, ABR, MBR, and $W_i$ values, to network device 140. Network device 140 may provide bearer information (e.g., including the ABR, MBR, and $W_i$ values) to base station 120/MME 130, as indicated by reference number 350.

As further shown in FIG. 10, process 1000 may include providing, to the user device, the QCI configuration information (block 1030). For example, in implementations described above in connection with FIG. 3, base station 120/MME 130 may receive bearer information 350 and may forward bearer information 350 to user device 110-1 to activate the bearer between user device 110-1 and a service provider device (e.g., one of video content provider 170, voice provider 180, and/or data services provider 190).

Returning to FIG. 10, process 1000 may include detecting congestion associated with the IP wireless access network (block 1040) and applying the ABR, MBR, and/or $W_i$ to bearer traffic, associated with the user device, to manage the congestion (block 1050). For example, in implementations described above in connection with FIG. 3, base station 120 may monitor resource utilization information of the IP wireless access network. During periods of congestion, base station 120 may allocate bandwidth to different users (e.g., user devices 110-1 and 110-2) based on the QoS settings associated with each respective bearer. Furthermore, user device 110, base station 120, and network device 140 may apply the uplink/downlink ABR and uplink/downlink MBR to provide traffic shaping and scheduling functions. Base station 120 may also control admission to the wireless access network based on resource utilization information and ABR values associated with particular bearers.

Process block 1050 may include the process blocks depicted in FIG. 11. As shown in FIG. 11, process block 1050 may include, regulating admission based on the ABR associated with QCI configuration information (block 1110). For example, in implementations described above in connection with FIG. 6, a user may utilize user device 110-1 to attempt to initially attach to the IP wireless access network and/or to request an application service, as indicated by reference number 620. Base station 120 may detect initial attach/service request 620 and may determine whether to accept or deny initial attach/service request 620 based on QCI configuration information 610 and/or network resource utilization information 630. For example, base station 120 may determine whether to accept or deny initial attach/service request 620 of user device 110-1 based on wireless usage patterns (e.g., by other user devices 110 associated with base station 120), the uplink/downlink ABR (e.g., associated with the QCI) from QCI configuration information 610, priorities associated with users of the other user devices 110 associated with base station 120, etc.

Process block 1050 may also include calculating allocation of uplink and/or downlink bandwidth for the particular QCI value based on the weight factor (block 1120). For example, in implementations described above in connection with FIG. 4, scheduler 400 in base station 120 may include UL queue server 410 and DL queue server 430. DL queue server 430, for example, may service queues 440 with traffic directed to user devices 110. Each queue of queues 440 may include traffic associated with a different QCI value and weight value (e.g., "QCI1($W_{D1}$)," "QCI2($W_{D2}$)," . . . , "QCIn($W_{Dn}$)"). During periods of congestion, DL queue server 430 may allocate certain amounts of bandwidth for queues 440 based on available downlink bandwidth (e.g., for non-GBR traffic) and a $W_{Di}$ value associated with each queue. The $W_{Di}$ value may correspond to downlink $W_i$ values received, for example, from network device 140 via bearer information 350 and 390. DL queue server 430 may apply a bandwidth weight factor, $W_{Di}$, to each active queue of queues 440 to determine a downlink bandwidth allocation for each QCI value.

Process block 1050 may also include scheduling traffic based on the ABR, MBR, and/or $W_i$ associated with the QCI configuration information (block 1130). For example, in implementations described above in connection with FIG. 7, base station 120 may include a scheduler 700 that services multiple QCI-specific queues 710 and multiple sub-queues 730. When ABR and MBR are configured for a specific bearer (e.g., associated with $QCI_1$ traffic queue 710-1 or $QCI_2$ traffic queue 710-2), scheduler 700 may guarantee the ABR associated with the bearer, and the rest of the traffic for the bearer (e.g., the MBR bandwidth minus the guaranteed ABR bandwidth) may be directed to one of sub-queues 730. Queue server 720 may apply a bandwidth weight factor, $W_i$, to each active sub-queue of sub-queues 730 to determine a bandwidth allocation for each QCI value.

Figure 12:
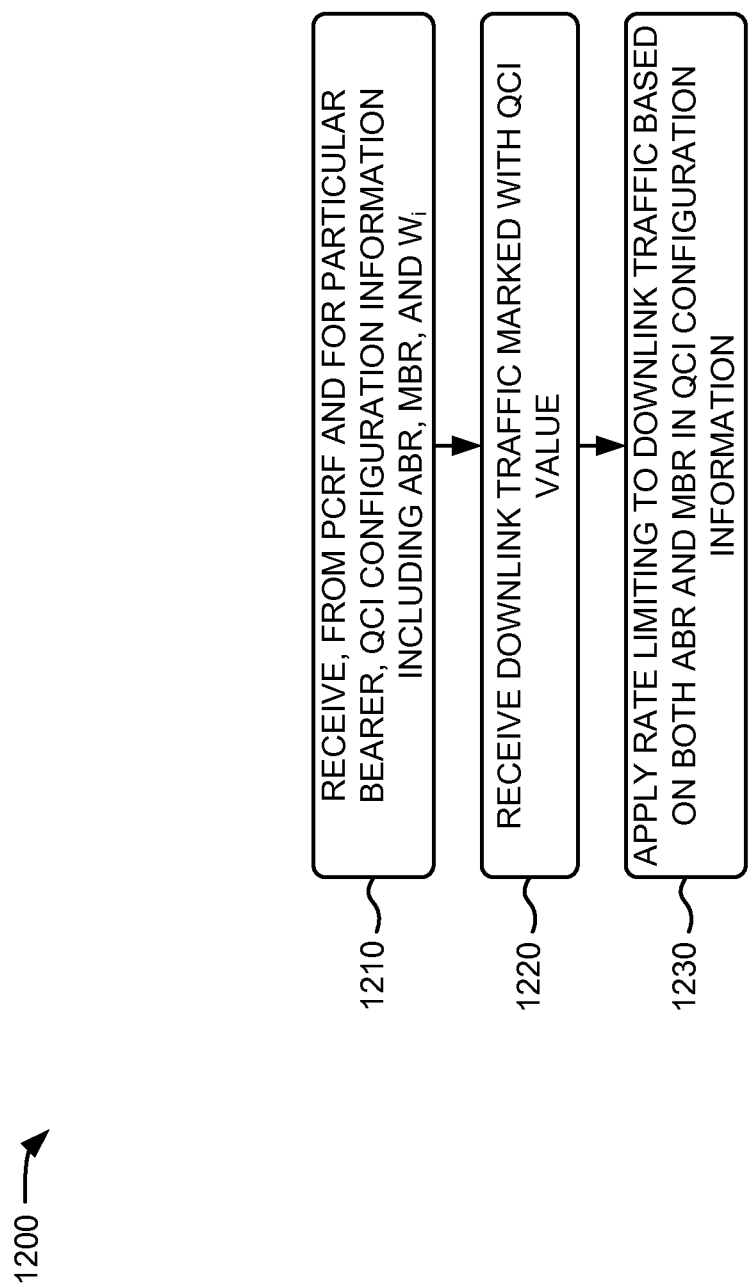
FIG. 12 is a flow chart of an example process for providing rate limiting of bearer traffic in a wireless access network according to an implementation described herein.

FIG. 12 is a flow chart of an example process 1200 for providing rate limiting of bearer traffic in a wireless access network according to an implementation described herein. In one implementation, process 1200 may be performed by user device 110 or network device 140. In another implementation, some or all of process 1200 may be performed by another device or group of devices, including or excluding user device 110 or network device 140.

As illustrated in FIG. 12, process 1200 may include receiving, from a PCRF and for a particular bearer, QCI configuration information including an ABR, an MBR, and a weight factor ($W_i$) (block 1210), and receiving downlink traffic marked with a QCI value (block 1220). For example, in implementations described above in connection with FIG. 5, user device 110 or network device 140 may employ a token bucket rate-limiting mechanism to enforce a long-term average transmission rate (e.g., an ABR associated with a particular QCI) while permitting bounded bursts (e.g., up to a MBR). The ABR and MBR values associated with each QCI may be provided to user device 110 and network device 140 from PCRF 150 (e.g., via subscriber policy 340 and/or bearer information 350 of FIG. 3). In this approach, a queue 500 that includes uplink or downlink traffic to be rate limited may be serviced by a queue regulator 510.

Returning to FIG. 12, process 1200 may include applying rate limiting to the downlink traffic based on the ABR, the MBR, and/or the weight factor ($W_i$) (block 1230). For example, in implementations described above in connection with FIG. 5, user device 110 and/or network device 140 may apply a leaky bucket mechanism to regulate a long-term average transmission rate (e.g., the uplink or downlink ABR associated with a particular QCI value) while still permitting bursts of a predetermined size (e.g., the uplink or downlink MBR associated with the particular QCI value). The rate, R, of token generator 530 may define the long-term average traffic rate; the depth, D, of token bucket 520 may define the maximum burst size that queue regulator 510 may allow; and the length, L, of packet queue 500 may bound the amount of delay that a packet can incur at queue regulator 510.

Systems and/or methods described herein may receive a policy for subscriber traffic over a particular bearer in an IP wireless access network. The policy may be configured for particular subscribers and/or applications to include a particular QCI value associated with a bearer request; and an ABR value, an MBR value, and a weight factor associated with the QCI value. The systems and/or methods may detect network congestion associated with the IP wireless access network and may apply, to the bearer traffic, the weight factor, the ABR value, and/or the MBR value to manage the network congestion.

The foregoing description of implementations provides illustration and description, but is not intended to be exhaustive or to limit the invention to the precise form disclosed. Modifications and variations are possible in light of the above teachings or may be acquired from practice of the invention.

For example, while series of blocks have been described with regard to FIGS. 10-12, the order of the blocks may be modified in other implementations. Further, non-dependent blocks may be performed in parallel.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Further, certain portions, described herein, may be implemented as a "component" that performs one or more functions. These components may include hardware, such as an ASIC or a FPGA, or a combination of hardware and software.

Even though particular combinations of features are recited in the claims and/or disclosed in the specification, these combinations are not intended to limit disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method, comprising:
   receiving, by a computing device, a policy for subscriber traffic over a particular bearer for an Internet protocol (IP) wireless access network, where the policy includes a particular quality-of-service control indicator (QCI) value, and an average bit rate (ABR), a maximum bit rate (MBR), and a weight factor associated with the QCI value;
   detecting, by the computing device, network congestion associated with the IP wireless access network; and
   applying, by the computing device and to the subscriber traffic over the particular bearer, the weight factor and a combination of the ABR and the MBR to manage the network congestion.

2. The method of claim 1, further comprising:
   receiving, from a user device, a request that initiates creation of the particular bearer; and
   providing, to the user device and in response to the request, an uplink bandwidth allocation for the particular bearer based on the weight factor and the combination of the ABR and MBR.

3. The method of claim 1, further comprising:
   receiving, from a user device, a request that initiates creation of the particular bearer; and
   rejecting the request based on the ABR associated with the particular bearer and the network congestion, where the QCI value indicates a non-guaranteed bit rate.

4. The method of claim 1, further comprising:
   scheduling downlink traffic, received from a network device, for the particular bearer based on the weight factor in conjunction with weight factors associated with QCI values of other active bearers in the IP wireless access network.

5. The method of claim 1, where the IP wireless access network includes a Long Term Evolution (LTE) network.

6. The method of claim 5, where the computing device comprises a base station of the LTE network.

7. The method of claim 1, where the ABR includes a data rate limit and a particular averaging duration.

8. The method of claim 1, where applying the weight factor and the combination of the ABR and MBR to manage the network congestion comprises:
   grouping active bearers with a same weight factor value, and
   identifying a bandwidth allocation for each group of active bearers based on a proportion of the same weight factor value against a total of weight factor values of other groups of active bearers.

9. The method of claim 1, further comprising:
   receiving, from a policy and charging rules function (PCRF) device, the policy for the subscriber traffic; and
   providing the policy to the computing device.

10. A device, comprising:
    a memory to store a plurality of instructions; and
    a processor to execute instructions in the memory to:
       receive, from a user device, a request to initiate a bearer creation process for an Internet protocol (IP) wireless access network,
       receive, as part of the bearer creation process, a policy for subscriber traffic over a particular bearer of the IP wireless access network, where the policy includes a particular quality-of-service control indicator (QCI) value, an average bit rate (ABR) value, a maximum bit rate (MBR) value, and a weight factor value associated with the QCI value;
       monitor resource utilization associated with a wireless interface of the IP wireless access network; and
       apply, to the particular bearer, the weight factor value and a combination of the ABR and MBR values when the monitored resource utilization indicates congestion associated with the wireless interface of the IP wireless access network.

11. The device of claim 10, where, when applying the weight factor value and the combination of the ABR and MBR values, the processor is further to execute instructions in the memory to:
    apply the weight factor value in conjunction with weight factor values for other bearers associated with QCI values.

12. The device of claim 10, where the processor is further to execute instructions in the memory to:
    provide, to a user device associated with the particular bearer, a calculated uplink bandwidth allocation for the particular bearer based on the weight factor value, and
    apply a calculated downlink bandwidth allocation to traffic received from a network device.

13. The device of claim 10, where the ABR value includes a separate downlink ABR value and a separate uplink ABR value.

14. The device of claim 10, where the processor is further to execute instructions in the memory to:
    reject the request that initiates the bearer creation process based on the ABR value associated with the particular bearer and the monitoring of the resource utilization.

15. The device of claim 10, where the device comprises a base station of a Long Term Evolution (LTE) network.

16. The device of claim 10, where the weight factor value includes a first weight factor value for ABR traffic and a second weight factor value for MBR traffic.

17. A method performed by a network device, the method comprising:
    receiving, from a policy and charging rules function (PCRF) device in an IP wireless access network, a subscriber bearer policy that includes a particular quality-of-service control indicator (QCI) value, an average bit rate (ABR) value associated with the QCI value, and a maximum bit rate (MBR) value associated with the QCI value;

receiving, by the network device, downlink traffic for a bearer associated with the subscriber bearer policy, where the downlink traffic is marked with the particular QCI value; and applying, by the network device and based on the particular QCI value, rate limiting to the downlink traffic based on the ABR and MBR values.

18. The method of claim 17, where the rate limiting regulates a long-term average transmission rate over the bearer based on the ABR value and permits bursts over the bearer up to a predetermined size based on the MBR value.

19. A computer-readable memory comprising computer-executable instructions, the computer-readable memory comprising one or more instructions to:

send a request to initiate a bearer creation process for an Internet protocol (IP) wireless access network;

receive, from a base station associated with the IP wireless access network, a subscriber bearer policy that includes an average bit rate (ABR) value and a maximum bit rate (MBR) value associated with a bearer that is created based on the request to initiate the bearer creation process;

generate uplink traffic for the bearer, where the uplink traffic is marked with a particular quality-of-service control indicator (QCI) value; and apply, based on the particular QCI value, rate limiting to the uplink traffic that conforms with the ABR value and MBR value.

20. The computer-readable memory of claim 19, where the rate limiting regulates a long-term average transmission rate over the bearer based on the ABR value and permits bursts over the bearer up to a predetermined size based on the MBR value.

* * * * *